United States Patent Office.

PHILIP ALBERT EMANUEL, OF AIKEN, SOUTH CAROLINA.

PROCESS OF REDUCING KAOLINS AND CLAYS TO THEIR COMPONENT OXIDES.

SPECIFICATION forming part of Letters Patent No. 455,611, dated July 7, 1891.

Application filed December 29, 1890. Serial No. 376,105. (No specimens.)

*To all whom it may concern:*

Be it known that I, PHILIP ALBERT EMANUEL, a citizen of the United States, residing at Aiken, in the county of Aiken and State of South Carolina, have invented certain new and useful Improvements in Processes of Reducing Kaolins and Clays to their Component Oxides; and I do hereby declare the following to be a full, clear, and exact description of the invention, such as will enable others skilled in the art to which it appertains to make and use the same.

My invention relates to the separation of alumina from kaolin or clay beds; and its object is to provide an economical process for separating the said alumina from the other ingredients and also of preserving the by-products, whereby the waste may be made small and the production of alumina cheap.

While my process is applicable to most impure clays, for convenience I shall describe it as used with the almost pure kaolins of South Carolina.

My process is in two steps. The first consists in beating or churning the kaolin immersed in water until the mixture has about the consistency of cream, and then treating the thick liquid mass with slight excess of strong sulphuric acid. The mixture is then heated until the clay is decomposed, the alumina going into solution as sulphate of aluminium, while most of the silica is deposited as a precipitate. The mass is then evaporated to the proper concentration, in order to precipitate any silica that may have gone into solution. The solution of aluminium sulphate may then be readily separated from the insoluble silica by any of the ordinary means of filtration. The iron, (nearly invariably contained in kaolin as an impurity,) which has also been dissolved by the treatment with sulphuric acid, may be removed by treatment with binoxide of lead or manganese or in any other way known to chemists, leaving a solution of sulphate of aluminium practically pure. This solution is then evaporated to recover the salt. This ends the first step of my process.

In the second step of my process I start with sulphate of aluminium. It is immaterial whence the supply of the said sulphate is obtained, whether in accordance with the first step of my process or whether from extraneous channels. In this step I mix the aluminium sulphate in a suitable retort with a suitable proportion of sulphur and heat the mixture. The amount of sulphur used is, within reasonable limits, unimportant, as the sulphur is regained in the form of $H_2SO_4$ as a by-product. The sulphur having a high affinity for oxygen aids in breaking up the $Al_2(SO_4)_3$ into $Al_2O_3$ and $SO_2$, the reaction being, probably, $2Al_2(SO_4)_3 + 3S = 2Al_2O_3 + 9SO_2$. The $SO_2$ developed by this treatment is carried away and converted into $H_2SO_4$ in the usual way. Any excess of sulphur goes off as sulphur fumes, which by the aid of any suitable oxidizing agent are oxidized and converted into $SO_2$ on their way to the sulphuric-acid chambers. The alumina remaining in the retort, while generally containing a trace of sulphuric acid, is almost pure, and is well suited for use in the manufacture of the metal aluminium.

Some of the advantages of my process or processes are that in the first step by converting the kaolin and water into a creamy mass I separate the particles and reduce the kaolin to a very finely-divided state, and by using water, which rapidly absorbs $H_2SO_4$, as the suspensory medium I lay the solid particles open on every side to the attacks of the acid. In the heating which follows the acid is gradually concentrated, a part of the water being driven off and the acid entering into combination with the alumina of the kaolin. By this means the maximum effect of the sulphuric acid in dissolving the alumina out of the kaolin is obtained. Moreover, the silica separated from the clay by this treatment when washed is almost absolutely pure and has a market value sufficient to make it an important by-product.

It will be noted that in my process the sulphuric acid created in the last step may be used for treating fresh kaolin, and that the only other by-product, silica, is also preserved for use in the arts. Any excess of sulphuric acid from the process would find ready sale as a manufactured product. It will thus be seen that from crude kaolin and sulphuric acid I manufacture aluminium sulphate and silica, and that from the aluminium sulphate thus formed and sulphur I obtain alumina and (with the aid of a proper oxidizing agent) sulphuric acid. By thus economically producing as valuable by-products both sulphuric acid and silica, as well as the main product, alumina, I greatly reduce the cost of obtaining the alumina alone, and, moreover, the sulphur combines with the sulphate of alumina at a comparatively low temperature, thus diminishing the amount of fuel required and still further increasing the economy of my process.

Having thus described my invention, what I claim, and desire to secure by Letters Patent of the United States, is—

1. The process of extracting alumina from kaolins and clays, which consists in treating the clay with sulphuric acid and heat for the conversion of the alumina into sulphate of aluminium, separating this sulphate from the silica, and heating said sulphate with sulphur, substantially as described.

2. The process of extracting alumina from kaolins and clays, which consists in stirring the clay in water until the particles of clay are suspended in the water, treating this mixture with sulphuric acid and heat, separating the sulphate of aluminium from the silica, first by precipiting the silica remaining in solution by heat and then by filtering off all precipitates, and finally by heating the sulphate of aluminium with sulphur, substantially as described.

3. The process of extracting alumina from kaolins and clays, which consists in stirring the clay in water until the particles of clay are suspended in the water, treating this mixture with sulphuric acid and heat, separating the sulphate of aluminium from the silica, first by precipitating the silica remaining in solution by heat and then by filtering off all precipitates, separating the iron in solution with binoxide of lead or manganese, and finally by heating the sulphate of aluminium with sulphur, substantially as described.

4. The process of separating kaolins and clays into their component oxides, which consists in stirring the clay in water until the particles of clay are suspended in the water, treating this mixture with sulphuric acid and heat, separating the sulphate of aluminium from the silica, first by precipiting the silica remaining in solution by heat and then by filtering off all precipitates, washing the silica, evaporating the solution of sulphate of aluminium, and finally heating said sulphate with sulphur, substantially as described.

5. The process of separating kaolins and clays into their component oxides, which consists in stirring the clay in water until the particles of clay are suspended in the water, treating this mixture with sulphuric acid and heat, separating the sulphate of aluminium from the silica, first by precipitating the silica remaining in solution by heat and then by filtering off all precipitates, washing the silica, evaporating the solution of sulphate of aluminium, and finally heating said sulphate with sulphur, oxidizing the free sulphur fumes, and converting the $SO_2$ into sulphuric acid, substantially as described.

6. The process of reducing aluminium sulphate to aluminium oxide, which consists in mixing the sulphate with sulphur and heating the mixture, substantially as described.

7. The process of reducing aluminium sulphate to aluminium oxide and regaining the sulphur dioxide, which consists in mixing the sulphate with sulphur, heating the mixture, oxidizing the free sulphur in the fumes thrown off, and gathering all those fumes into sulphuric-acid chambers, substantially as described.

In testimony whereof I affix my signature in presence of two witnesses.

PHILIP ALBERT EMANUEL.

Witnesses:
A. H. ASHLEY,
S. B. PLATT.